Sept. 20, 1938.  H. WITT  2,130,940
WATER LIFTING APPARATUS
Filed Oct. 13, 1937
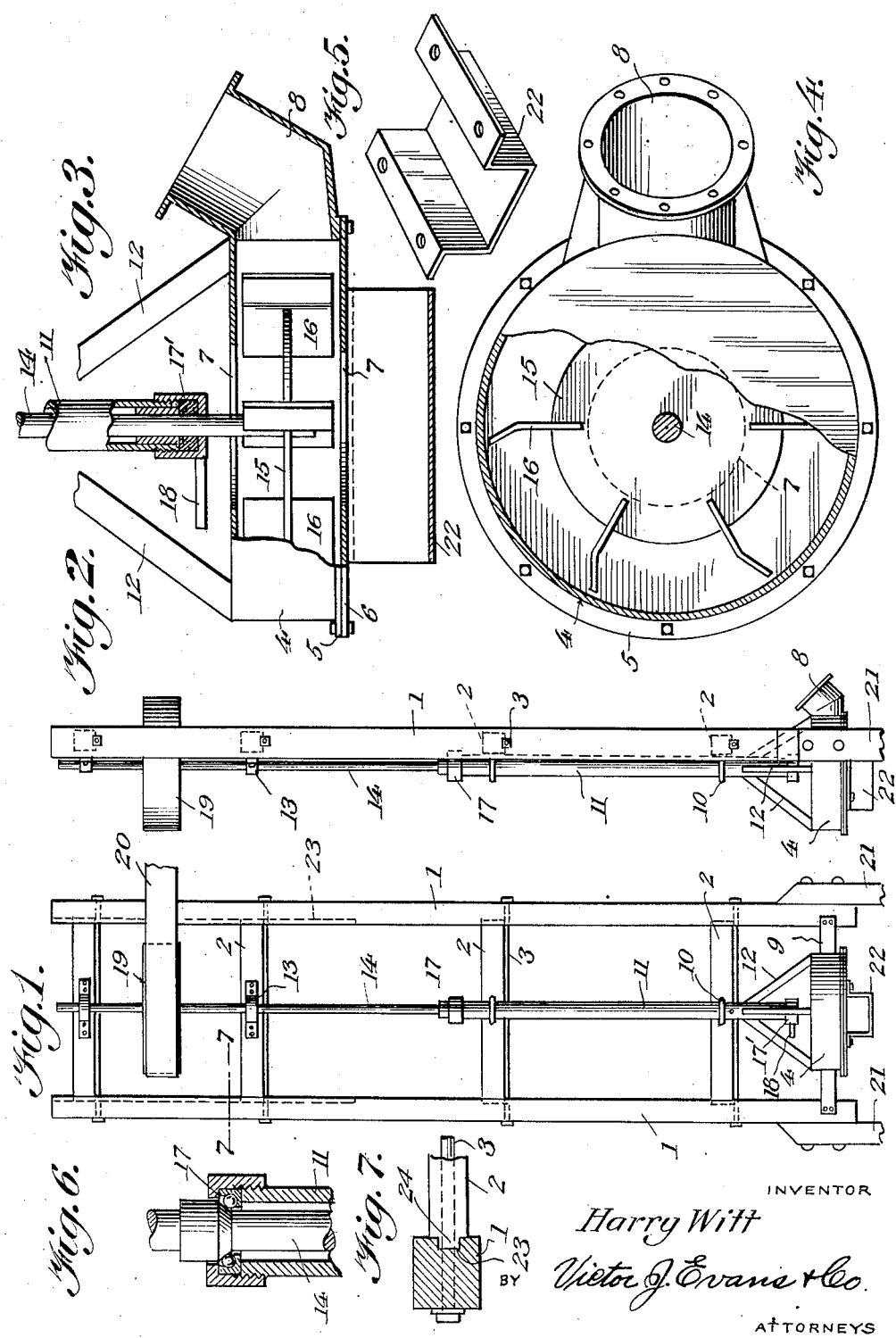
INVENTOR
*Harry Witt*
BY *Victor J. Evans & Co.*
ATTORNEYS Patented Sept. 20, 1938

2,130,940

UNITED STATES PATENT OFFICE 2,130,940

WATER LIFTING APPARATUS

Harry Witt, Wolf Point, Mont.

Application October 13, 1937, Serial No. 168,803

1 Claim. (Cl. 103—104)

This invention relates to water lifting apparatus, and its general object is to provide an apparatus of that character which is primarily designed for irrigation purposes, in that it includes a rotary pump for disposal within a source of water, such as an irrigation canal, ditch, stream or the like, and an upright rig for supporting the pump and its driving means, the rig being of any height, or adjustable to any height, to extend above the bank of the water source, so that suitable power means can be applied to the driving means, as will be apparent.

A further object is to provide a water lifting apparatus that includes a rotary pump having an intake guard in the form of a trough and which prevents the passage of sand and debris from the bottom of the water source, to the pump, yet allows free passage of water to and within the pump.

A still further object is to provide a water lifting apparatus including a rotary pump, and a water tight housing for the driving shaft thereof.

Another object is to provide a water lifting apparatus of the character set forth that is simple in construction, easy to apply in position for use, and is inexpensive to manufacture, as well as extremely efficient in operation and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a front view of the apparatus which forms the subject matter of the present invention.

Figure 2 is a side elevation.

Figure 3 is a fragmentary sectional view illustrating the pump and relative parts thereof.

Figure 4 is a top plan view of the pump with parts broken away and in section.

Figure 5 is a detail perspective view of the pump guard.

Figure 6 is a detail view partly in section illustrating the thrust bearing for the drive shaft.

Figure 7 is a sectional view taken approximately on line 7—7 of Figure 1.

Referring to the drawing in detail, and particularly to Figures 1 and 2, it will be noted that my apparatus includes an elongated frame made up of side bars 1 and cross bars 2 which may have their ends countersunk in the side bars or secured thereto in any appropriate manner. However, I have illustrated reenforcing rods 3 extending through the side bars and bridging the same, with the cross bars resting thereon, the reenforcing rods acting to hold the frame rigid, as will be apparent.

The pump is of the rotary type and includes a drum like casing made up of a body 4 and having an annular flange 5 extending outwardly from the lower end thereof and to which is secured a cover plate 6 that provides the bottom of the casing, as best shown in Figure 3. The cover plate as well as the upper wall of the casing, each have inlet openings 7 therein, and the circular wall has formed thereon or otherwise secured thereto, a discharge spout 8 that preferably rises therefrom at an inclination and has a flanged outer end for the purpose of securing a pipe line thereto, for conveying the water from the pump as will be apparent.

The pump is disposed between the lower end of the frame and is held accordingly by bracket members 9 having their ends secured to the casing and the side bars, respectively as clearly shown in Figure 1.

Extending longitudinally of the frame and secured to the lowermost cross bars midway their ends, by U-bolts or the like 10 is a drive shaft housing 11 which has its lower end spaced from the pump casing and welded or otherwise secured to the housing 11 are bracket arms 12 that radiate therefrom in diverging relation and have their outer ends welded or otherwise secured to the upper wall of the pump casing at the periphery thereof, as best shown in Figure 3, therefore it will be obvious that the securing means for the housing 11 cooperates with the bracket members 9 for rigidly securing the pump with respect to the frame.

Mounted for rotation in bearings 13 secured to the upper cross bars 2 is a drive shaft 14 that extends through the housing 11 and into the pump casing. The inner end of the shaft 14 has secured thereto a disk member 15 that has fixed thereto and radiating therefrom flat vanes 16 which have their outer end portions bent at an outward inclination as best shown in Figure 4.

A thrust bearing 17 of the ball type is provided for the shaft 14, at the upper end of the housing, and a stuffing box 17' of the threaded nut type is provided at the lower end of the housing. The nut of the stuffing box may have secured thereto a handle 18, as best shown in Figure 3 to facilitate turning thereof.

Keyed or otherwise secured to the upper portion of the drive shaft 14 is a pulley 19 for receiving a belt 20 which of course is connected to a pulley of suitable driving means such as a gasoline engine or the like.

The lower end of the frame may have secured thereto and extending therefrom legs 21, for supporting the frame as will be apparent, and mounted on the cover plate 6 is a guard member in the form of a rectangular trough 22 that underlies the intake or inlet opening of the cover plate. It will be noted as best shown in Figure 5 that the guard member is substantially U-shaped in cross section and has open ends, to allow free passage of water within the pump, and it will be obvious that the guard member prevents the pump from drawing in sand and debris from the bottom of the water source.

The pulley 19 may be mounted for adjustment on the shaft 14, and the two upper or bearing carrying cross bars 2 are adjustable accordingly with respect to the side bars 1, to dispose the bearings 13 an equal distance upon the opposite sides of the pulley so that lateral thrust on the bearings will be equal. By that feature, it will be obvious that the pulley can be disposed above banks of irrigation canals, ditches and the like, of various heights for easy application and removal of the belt with respect to the pulley.

In order to allow for the adjustments as above set forth, the pulley is preferably keyed to the shaft, and the groove in the shaft for the key is of sufficient length to compensate for the adjustment. The side bars 1 are provided with grooves 23, as best shown in Figure 7, and which extend along the longitudinal centers of the confronting faces thereof, to slidably receive the reduced ends 24 of the bearing carrying cross bars 2, as will be obvious upon inspection of Figure 1. After the bearing carrying bars have been adjusted to their proper positions, the rods 3 which must necessarily be loosened to allow for the adjustment of said bars, are then tightened. The side bars may have slots therein to receive the rods, or a plurality of openings for that purpose, as will be apparent.

From the above description and disclosure of the drawing, it will be obvious that I have provided a water lifting apparatus which can be readily mounted with respect to an irrigation canal, ditch, stream or the like for drawing water therefrom, and due to the use of the guard means and the protected housing for the drive shaft of the pump, it will be apparent that the latter is capable of performing its intended function for a prolonged period of time without attention or repairs.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A water lifting apparatus for irrigation purposes, and comprising an elongated frame including side bars and cross bars bridging the side bars, a pump including a drum casing at the lower end of the frame and having intake openings in the upper and lower walls thereof, a rectangular trough providing guard means for the intake opening in the lower wall and fixed to the latter, said trough having a closed bottom and open ends, discharge means for the casing, bearings secured on the upper cross bars, a drive shaft mounted for rotation in the bearings and terminating at its lower end in the casing, a disk secured to the lower end of the shaft, vanes secured to and extending from the periphery of the disk, a housing for the lower portion of the shaft and fixed to the lower cross bars, means for fixing the casing to the housing and to the side bars, a pulley for driving the shaft and adjustably mounted thereon between the upper cross bars for axial movement, and said upper cross bars being adjustable for disposing the bearings for the shaft an equal distance upon opposite sides of the pulley.

HARRY WITT.